United States Patent [19]

Schwarz

[11] 4,417,197

[45] Nov. 22, 1983

[54] ELECTRONIC SYSTEM FOR SIMULTANEOUS CONTROL OF TWO OR MORE PULSE MODULATORS

[76] Inventor: Francisc C. Schwarz, Round Hill Rd., Lincoln, Mass. 01773

[21] Appl. No.: 286,891

[22] Filed: Jul. 27, 1981

[51] Int. Cl.³ .......................... G05F 1/46; H02M 3/00
[52] U.S. Cl. .................................. 323/272; 323/283; 363/65; 363/124
[58] Field of Search ...................... 363/8–10, 363/40–43, 65, 69–72, 124; 323/271, 272, 282–288

[56] References Cited

U.S. PATENT DOCUMENTS

| | | | |
|---|---|---|---|
| 3,226,630 | 12/1965 | Lampke | 323/282 |
| 3,445,752 | 5/1969 | Horvat | 323/272 |
| 4,034,232 | 7/1977 | LaVenture | 323/283 X |
| 4,290,101 | 9/1981 | Hergenhan | 363/65 |
| 4,293,812 | 10/1981 | Kubach et al. | 323/272 |

Primary Examiner—Peter S. Wong
Attorney, Agent, or Firm—Frijouf, Rust & Pyle

[57] ABSTRACT

Disclosed is an electronic system, that controls simultaneously two or more asynchronous pulse modulators such that the sum of all pulses is modulated as if emanating from one single source.

5 Claims, 4 Drawing Figures

ELECTRONIC SYSTEM FOR SIMULTANEOUS CONTROL OF TWO OR MORE PULSE MODULATORS

BACKGROUND OF THE INVENTION

This invention relates to electronic control systems for static power converters and is applicable to any converter of this kind. One single control system can govern a number of similar power converters in such a manner that operation of the power converters are staggered in time. For instance, two so-called "choppers" can operate in a sequence so that the pulses of the second chopper appear in time between the pulses of the first chopper; yet, the sum of the pulses of both choppers is fed into one single output. This sequence of pulses is so governed by one single control system that it will perform a function as if these pulses were emanating from one single source i.e., from one single chopper.

The following prior art are introduced for the purpose of reference and are believed pertinent to the present invention.

U.S. Pat. No. 3,659,184 issued Apr. 25, 1972, Analog Signal to Discrete Time Interval Converter (ADCTIC), Francisc C. Schwarz; "An Improved Method of Resonant Current Pulse Modulation for Power Converters", Francisc C. Schwartz, IEEE Transactions on Industrial Electronics and Control Instrumentation, Vol. IECI-23, No. 2, May 1976; U.S. Pat. No. 3,953,779 issued Apr. 27, 1976, Electronic Control System for Efficient Transfer of Power through Resonant Circuits, Francisc C. Schwarz; U.S. Pat. No. 4,096,557 issued June 20, 1978, Controllable Four Quadrant A.C. to A.C. and D.C. Converter Employing an Internal High Frequency Series Resonant Link, Francisc C. Schwarz; U.S. Pat. No. 3,663,940 issued May 16, 1972, Controllable Load Insensitive Power Converters, Francisc C. Schwarz; "Principles of Inverter Circuits" by B. D. Bedford and R. G. Hoft, Wiley, 1964, New York.

The above explained philosophy is applicable to a number of power converters larger than two. It is then possible to attain a sequence of modulated pulses at a given frequency; yet, each of the pulse supplying mechanisms originates at a lower frequency, which is a fraction of the resulting total converter frequency.

In this way it is possible to obtain a sequence of pulses with a time resolution, that is an excess of the resolution that could be obtained with the components of one single converter.

SUMMARY OF THE INVENTION

This invention provides a number of individual converters with the capability of operating jointly in a way that time revolution is raised to a multiple of the corresponding resolution of one of the composing converters.

Accordingly it is the objective of this invention to increase the attainable operating converter frequency beyond a point that could be attained with one single converter mechanism.

It is a further object of this invention to improve the control system for inverters-converters.

It is another object of the invention to reduce the size of input and output filters that are needed to smooth the waveform which results from the succession of individual pulses of operation of the converter.

It is yet a further object of the invention to reduce the electric noise that would emanate from the internal operation of a converter and reduce environmental noise.

It is yet another and further object of the invention to improve the considerable effectiveness of the converter by way of a significant reduction of size of the components, as indicated above, and, furthermore, by use of small filter materials.

BRIEF DESCRIPTION OF THE DRAWINGS

The above mentioned and other objects of the invention will become apparent from the following detailed description of the invention, when read in conjunction with the annexed drawings in which.

DESCRIPTION OF THE PREFERRED EMBODIMENT

Figure 1:
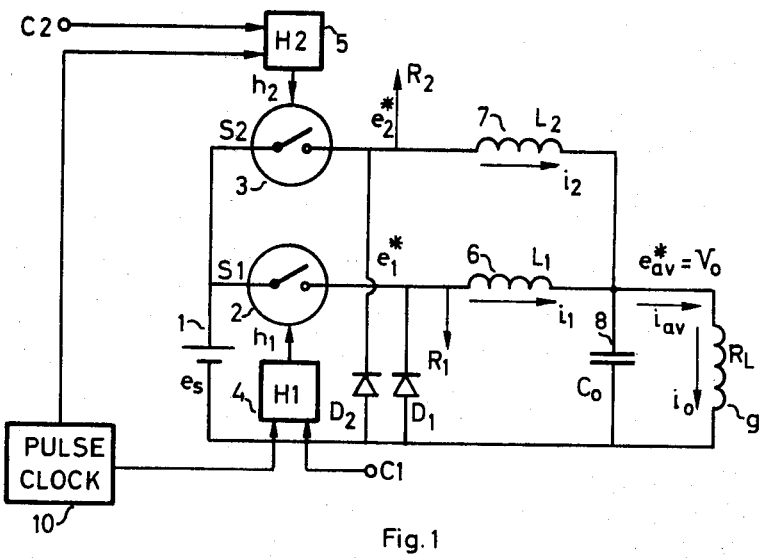
FIG. 1 is the symbolic schematic diagram of a dual chopper transferring and controlling electric energy from an unipolar source with voltage $e_s$ to a load $R_L$.

In the drawings inductors, capacitors, diodes, controlled rectifiers and resistors are designated by conventional symbols and by reference characters L, C, CR, and R with various subscripts. In the specification and claims the 5 reference characters for inductors, capacitors, controlled recitifiers and resistors may also be used as algebraic symbols to represent the inductance in Henrys, the capacitance in Farads, and the resistance in Ohms of the several parts. In each case the sense of the usage will be clear from the context.

The invention will be described as it is applied with a dual chopper as shown in FIG. 1. However, this invention is not restricted to this use. It is readily applied to other systems, which transfer energy from an electric source to a load mechanism with the use of two or more of the concerned electric power converter elements. The here disclosed control system can be used to govern voltage or current signals for the purpose of governing two or more of these converter elements simultaneously for the intended purpose.

Referring, to FIG. 1 the shown circuit is composed of two series "choppers", as well known to those skilled in the art. Each of these choppers consists of a switch Si (i=1,2), which activates a series inductor Li to feed one common load $R_L$. The therewith connected sequence of pulses is smoothed by a capacitor $C_o$, which is located in parallel with the above referred to load $R_L$. The switch S1 is governed by a control mechanism H1, which emits a signal h1. This signal h1 governs the switch S1 in such a way that switch S1 closes when h1 assumes a "high" position. The switch S1 opens when h1 has a low value or zero. Switch S1 can be implemented by a semi-conductor device such as a transistor or a thyristor, as well known to those skilled in the art. The control block H1 receives two signals which emanate from the pulse clock 10 and one of the outputs C1 of the control system depicted in FIG. 2.

The signal h1 is analogous is shape with the resulting power pulse $e_1^*$, which appears at the output of the switch S1. This power signal $e_1^*$ also forms the input waveform to the following low pass filter consisting of inductor L1 and capacitor $C_o$ shown in FIG. 1.

The above described chopper and the mode of operation is well described in the literature. The control by way of an electronic control system is also described in the above cited literature.

The novelty of this invention is the introduction of a second chopper to serve the same purpose as the one explained above with reference to the first chopper and the specifically applied method of control. The second chopper operates in an analogous manner to the first chopper described above. The second chopper comprises switch S2, which is governed by a control block H2 and operates into an inductor L2 and the same smoothing capacitor $C_o$. The novelty of control by one single control mechanism of both choppers will be explained hereinafter.

Each of the two choppers as described above with reference to FIG. 1 is governed by an ASDTIC control mechanism as described in detail in the first above named reference. The essence of the referred to method of control is the comparison of an unaltered signel $e_i$ (i=1,2) entering the low pass LC filter, with a reference signal $e_r$. The algebraic sum of the two signals is integrated in the integrating capacitor $C_i$. The fact that the amplifier 16 returns at the end of each cycle to the voltage $V_T$ in order to energize the discriminator D requires that $$\int_{t_k}^{t_{k+1}} e^* dt = \int_{t_k}^{t_{k+1}} e_r dt \quad (1)$$

where $$t_k = \sum_{i=1}^{k} \{t_i - t_{i-1}\}$$

It is evident from equation (1), that the power signal $e^*$ has the same Volt-15 second content as the reference signal $e_r$.

Figure 2:
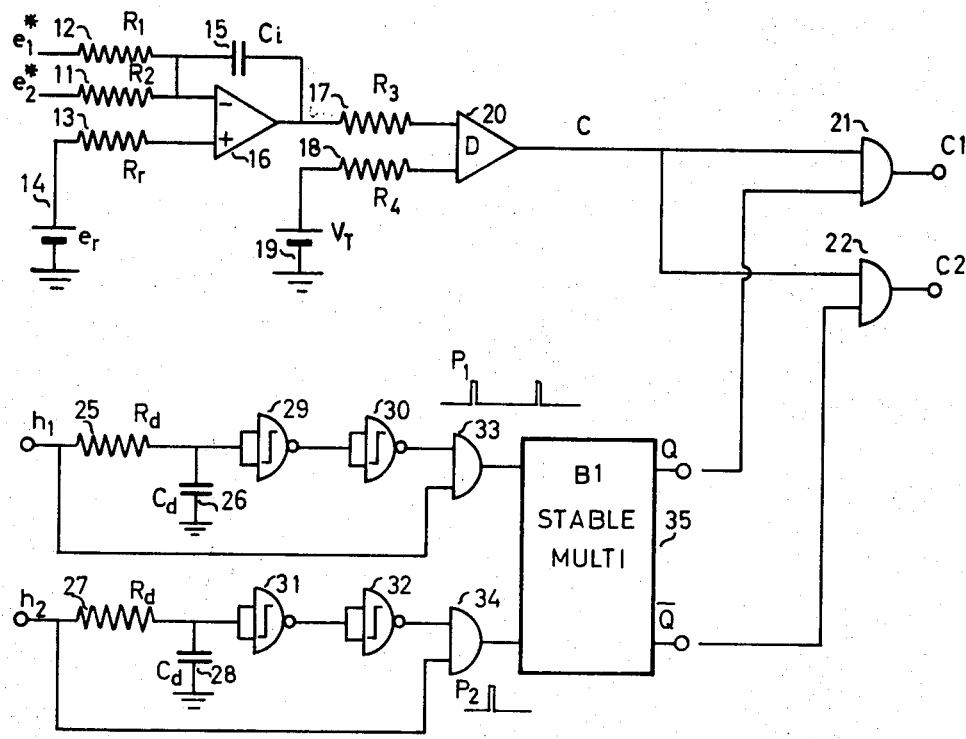
FIG. 2 illustrates the preferred embodiment of the invention incorporating the basic principle of operation of the electronic control system.

The same is, of course, true if the input terminals of the two inductors $L_1$ and $L_2$ in FIG. 1 are connected to the resistors $R_1$ and $R_2$ as shown in FIG. 2. The sum of $e_1^*$ and $e_2^*$ is then equal to the reference source $e_r$ when considered over one cycle of operation. The purpose of the present invention is to energize $e_1^*$ and $e_2^*$ in sequence, to produce a waveform pattern as shown in part (c) of FIG. 3 when viewed from the capacitor $C_o$ and looking at both, the input of $L_1$ and of $L_2$. It is, furthermore, required that equation (1) remains true during a shorter time interval $t_k - t_{k-1}$.

Preferably equation (1) will remain true for approximately, one half of the time interval, namely nearly one half time $t_k - t_{k-1}$, if nothing else including the source voltage $e_s$ and the load R1 were to change. If, however, any of the parameters which govern the operation of the circuit were to change, then one of the chopper circuits would not start in the middle of the other chopper operation interval, and would start only when equation (1) would be satisfied for the sum of the two filter input signals $e_c^*$, as illustrated in part (c) of FIG. 3.

Figure 3:
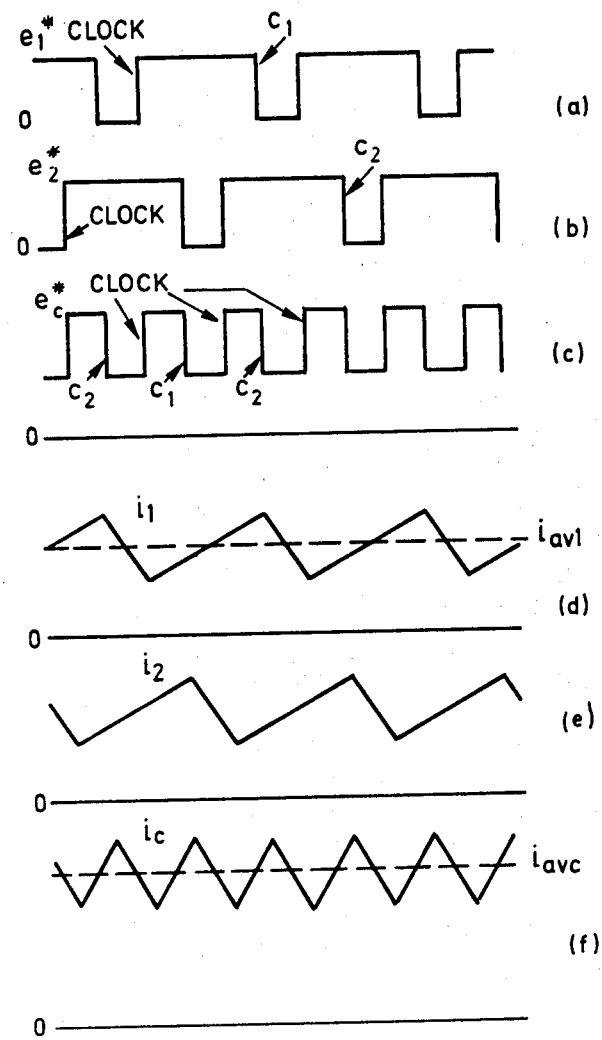
FIG. 3 illustrates the voltage and current waveforms associated with the converter system depicted in FIG. 1 and governed by the control system depicted in FIG. 2.

A closer inspection of FIG. 3 indicates that its part (c), which is the sum of parts (a) and (b) respectively, has doubled the frequency of part (b). This is implemented by enabling the drive signals h1 and h2 respectively to form the pulses $P_1$ and $P_2$. These pulses $P_1$ and $P_2$ cause a change of state of the Bistable Multivibrator 35. The output terminals Q and $\overline{Q}$ assume in alternating sequence the well known positions of one or zero. These two output signals Q and $\overline{Q}$ operate on an AND circuits 21 and 22 in such a manner, that only one of the signal will pass the signal C emanating from the discriminator D. Thus the signal C can pass only through one of the gates 21 and 22 at one time.

The control signal C, which emanates from the discriminator 20, is divided by the AND gates 21 and 22 into the signals C1 and C2, as indicated in FIG. 2. These two signals C1 and C2 are used to terminate the drives for the switches S1 and S2 respectively. The signals C1 and C2 respectively act upon the control systems H1 and H2 respectively to generate the drive signals h1 and h2. The operation of the control blocks Hi can be thought of as that of Bistable Multivibrators, which are being turned on by the pulse clock 10 and terminated by the signals C1 and C2 respectively. The mechanization for the drive signals of the switches Si as indicated in FIG. 1 is restricted to waveforms similar to the waveforms indicated in FIG. 3. This restriction can, of course, be removed by application of techniques which are well known to those skilled in the art.

The objective of this explanation is to explain the simultaneous control of two converters, which operate into the same load by means of one single control system.

The voltage and current waveforms, which ensue from the above described mode of operation and control, are depicted in FIG. 3. Inspection of FIG. 3 indicates that the ratio of the first harmonic component $|c_1|$ versus the average value $c_o$ of the concerned waveforms, namely the waveforms $e_1^*$ and $e_2^*$ shown in parts (a) and (b) of FIG. 3, is different of that of $e_c^*$ shown in part (c) of the same FIG. 3. If the letters a, b and c are being used to identify the coefficients of the respective Fourier series, then we can conclude by inspection that $$|c_{1a}|/c_{oa} > |c_{1c}|/c_{oc} \quad (2)$$

Likewise is:

$$|c_{1b}|/c_{ob} > |c_{1c}|/c_{oc} \quad (3)$$

A similar argument can be made for the current waveforms depicted in parts (d), (e) and (f) of FIG. 3. It can be concluded by inspection that $$|c_{1d}|/c_{od} > |c_{1f}|/c_{of} \quad (4)$$

and that, likewise, $$|c_{1e}|/c_{oe} > |c_{1f}|/c_{of} \quad (5)$$

The statements contained in the inequalities (2) through (5) are now repeated in words by saying that the ratio of the harmonic content of the individual pulse waveforms as indicated in the parts (a), (b), (d) and (e) versus the respective average values, is considerably larger than the ratio of the harmonic content of the waveforms depicted in parts (c) and (f) versus the respective average values. The above statement contains the essence of the here disclosed invention, as it contains two improvements with respect to the filtering requirement of the discussed converter system: First, the shape of the respective waveforms (a) and (b) and (d) and (e) of FIG.

3, as expressed by the respective voltage and current form factors, has been improved, as expressed by the inequalities (2) through (5). Second, the filter frequency has been raised by a factor of two, which allows a reduction of the concerned components by the same factor of two to achieve the same output voltage ripple.

The above described process can be expanded by the application of three, four, or more, choppers or other types of power converters, which are being governed by one single control system such as the one associated with the differential amplifier 16 in FIG. 2.

Figure 4:
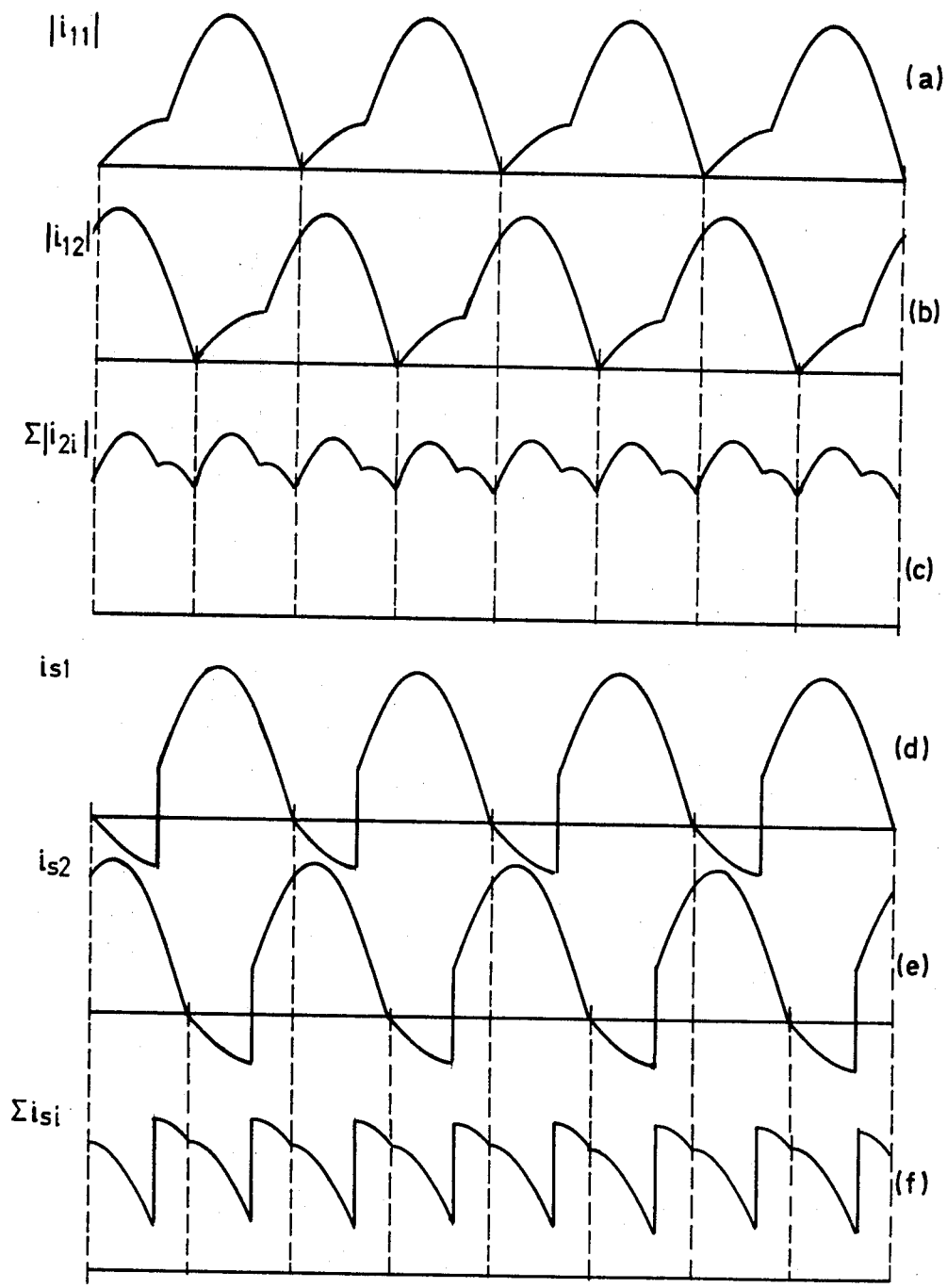
FIG. 4 illustrates the application of the same control mechanism as explained in this invention for the simultaneous control of current in series capacitor inverter-converters.

The above described concept can be applied also for the purpose of current control, as customary with series capacitor converters. This application of the ASDTIC control principle is contained also in the above cited references. The effect that the application of the same principle as explained above would have on the parallel operation of two full or half bridges, is indicated in parts (a), (b) and (c) of FIG. 4. It is seen, again, that the current form factor is greatly improved by adding the waveforms of parts (a) and (b) to form part (c) and that the frequency of operation is doubled. The benefit of an improved current form factor and a higher frequency of operation can be clearly appreciated by those skilled in the art. This is especially true for the reduction of the filter size needed to achieve a specific purpose in voltage limited secondary current sources. Parts (d) and (e) of FIG. 4 show the idealised input currents to the series resonant circuit. Part (f) of FIG. 4 indicates the sum of the input current waveforms, shown in parts (d) and (e) of that figure. It is obvious, that the burden on the input filter to suppress the electric noise caused by the operation of the converter is greatly reduced.

The above described application of the here disclosed invention for the control of current waveforms in power converters can be expanded from two to three, four or more converters, that would be governed by one single control system as described above.

It is further clarified that the governed pulses are so spaced as to allow the implementation of a modulation process whereby the concerned pulses would apparently emanate from one single converter element, as described also in the above cited references.

What is claimed is:

1. A circuit for controlling the transfer of energy from an input means to a single output, comprising in combination:

a first pulse generator for transferring electrical energy from the input means to the output;
    a second pulse generator for transferring electrical energy from the input means to the output;
    first input signal means connected to said first pulse generator to produce a first input pulse to said first pulse generator;
    second input signal means connected to said second pulse generator to provide a second input pulse to said second pulse generator;
    said first and second input signal means sequentially energizing said first and second pulse generators to sequentially transfer electrical energy from the input means to the output;
    reference signal means for providing a reference signal;
    comparator means for comparing the output of said first and second pulse generators to the reference signal from said reference signal means; and
    gate means connected to said first and second input signal means for changing the next input pulse to one of said first and second pulse generators in accordance with the difference between said reference signal and the previous output of the other of said first and second pulse generators.

2. A circuit as set forth in claim 1, wherein said first and second pulse generator comprise power switch means.

3. A circuit as set forth in claim 1, wherein said first and second input signal means includes a clock for generating clock pulses; and
    means connecting said clock pulses for sequentially activating said first and second input signal means.

4. A circuit as set forth in claim 3, wherein said comparator means comprises an integrator means for integrating the output of said first and second pulse generators; and
    a discriminator for discriminating between the output of said integrator means and a detection level to provide a discriminating output upon a desired output level of said integration means.

5. A circuit as set forth in claim 4, wherein said gate means includes a gate connected to first and second signal input means for sequentially deactivating the output of said first and second signal input means in accordance with the output of said discriminator.

* * * * *